(12) United States Patent
Chong et al.

(10) Patent No.: US 10,062,148 B2
(45) Date of Patent: Aug. 28, 2018

(54) METHOD FOR CONVERTING A COLOR FILTER ARRAY

(71) Applicants: SK hynix Inc., Gyeonggi-do (KR); Industry-University Cooperation Foundation Hanyang University, Seoul (KR)

(72) Inventors: Jong Wha Chong, Seoul (KR); Jong Joo Park, Seoul (KR); Sang Woo Ahn, Seoul (KR)

(73) Assignees: SK Hynix Inc., Gyeonggi-do (KR); Industry-University Cooperation Foundation Hanyang University, Seoul (KR)

( * ) Notice: Subject to any disclaimer, the term of this patent is extended or adjusted under 35 U.S.C. 154(b) by 68 days.

(21) Appl. No.: 15/060,185

(22) Filed: Mar. 3, 2016

(65) Prior Publication Data

US 2017/0098296 A1    Apr. 6, 2017

(30) Foreign Application Priority Data

Oct. 1, 2015 (KR) .................. 10-2015-0138451

(51) Int. Cl.
| | | |
|---|---|---|
| *H04N 5/335* | (2011.01) | |
| *G06T 3/40* | (2006.01) | |
| *H04N 9/30* | (2006.01) | |
| *H04N 9/04* | (2006.01) | |

(52) U.S. Cl.
CPC ........... *G06T 3/4015* (2013.01); *H04N 9/045* (2013.01); *H04N 9/30* (2013.01); *H04N 2209/045* (2013.01)

(58) Field of Classification Search
CPC .................................................. G06T 3/4015
See application file for complete search history.

(56) References Cited

U.S. PATENT DOCUMENTS

| | | | |
|---|---|---|---|
| 8,274,715 B2 * | 9/2012 | Hamilton, Jr. | H04N 9/045 348/147 |
| 8,755,640 B2 | 6/2014 | Saito et al. | |
| 2013/0272605 A1 | 10/2013 | Saito et al. | |
| 2014/0328538 A1 * | 11/2014 | Kim | H04N 9/045 382/167 |
| 2015/0029358 A1 | 1/2015 | Kaizu | |
| 2015/0103212 A1 | 4/2015 | Saito | |

FOREIGN PATENT DOCUMENTS

KR    1020110023757    3/2011

OTHER PUBLICATIONS

Park, J., et al., A Demosaicing Method for Digital Cameras with a White-RGB Color Filter Array, ETRI Journal, Feb. 2016, pp. 164-173, vol. 38, No. 1.

* cited by examiner

*Primary Examiner* — Gary C Vieaux
(74) *Attorney, Agent, or Firm* — IP & T Group LLP

(57) ABSTRACT

Provided are a method and a device for converting a White-Red-Green-Blue (WRGB) color filter array into a Red-Green-Blue (RGB) color filter array in order to be easily applied to a commercial digital camera. The method includes (a) correcting a color of a White-Red-Green-Blue (WRGB) color filter array, (b) converting the WRGB color filter array into a Red-Green-Blue (RGB) color filter array, and (c) correcting a green of the RGB color filter array by using multichannel color difference value.

8 Claims, 6 Drawing Sheets

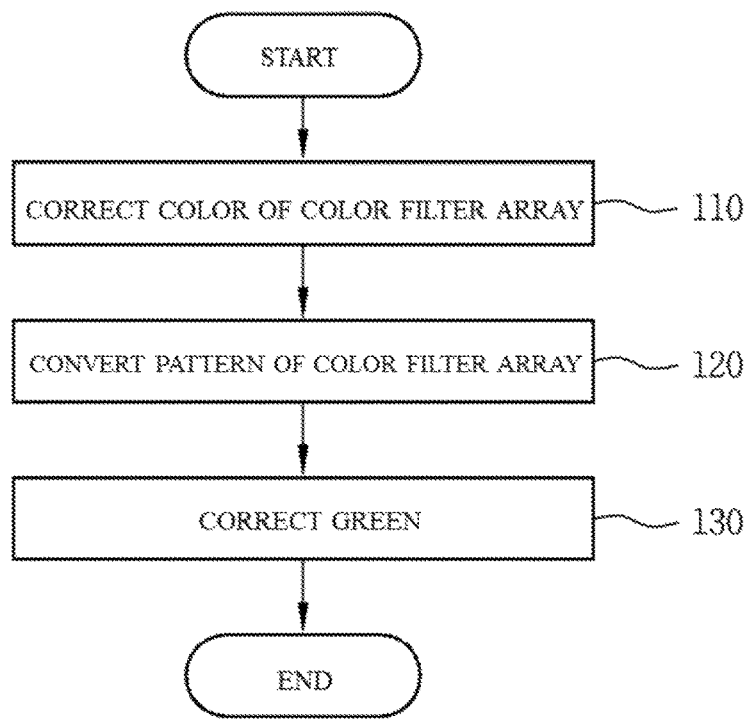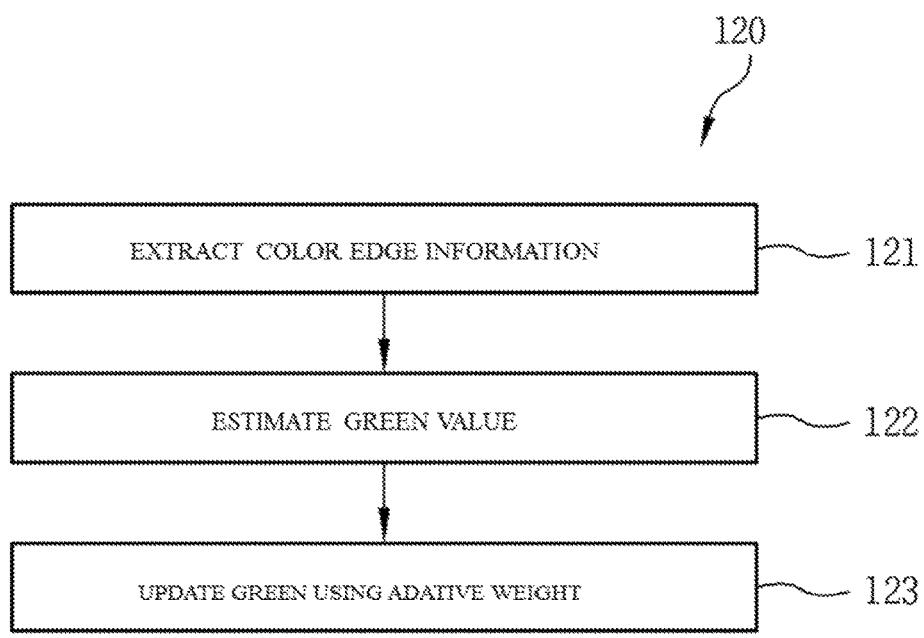

(a)　　　　　(b)　　　　　(c)

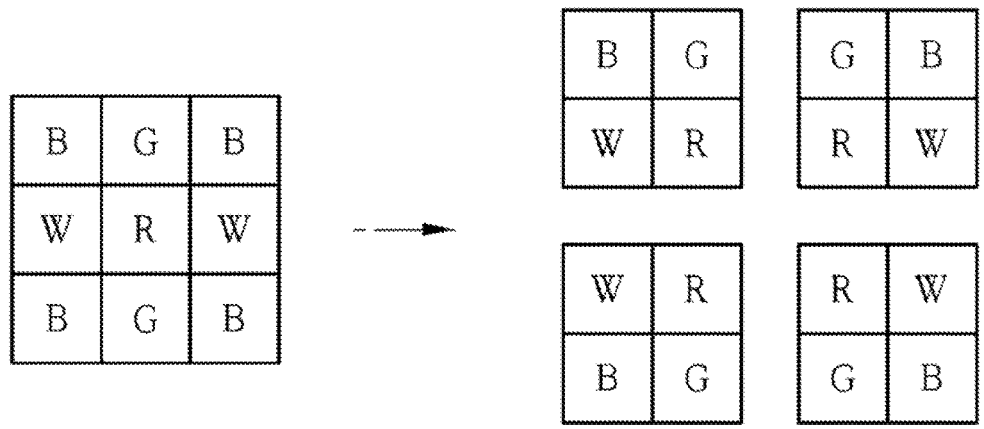

FIG.7

| D1 | D1 | D1 | D1 | D1 |
|----|----|----|----|----|
| D1 | D1 | D1 | D1 | D1 |
| D1 | D1 | D1 | D2 | D2 |
| D1 | D1 | D2 | D2 | D2 |
| D2 | D2 | D2 | D2 | D2 |

FIG.8

|     | i-1 | i | i+1 |
|-----|-----|---|-----|
| j-1 | G | B | G |
| j   | R | W | R |
| j+1 | G | B | G |

FIG.9

|     | i-2 | i-1 | i | i+1 | i+2 |
|-----|-----|-----|---|-----|-----|
| j-2 | W | R | W | R | W |
| j-1 | B | G | B | G | B |
| j   | W | R | W | R | W |
| j+1 | B | G | B | G | B |
| j+2 | W | R | W | R | W |

FIG.10
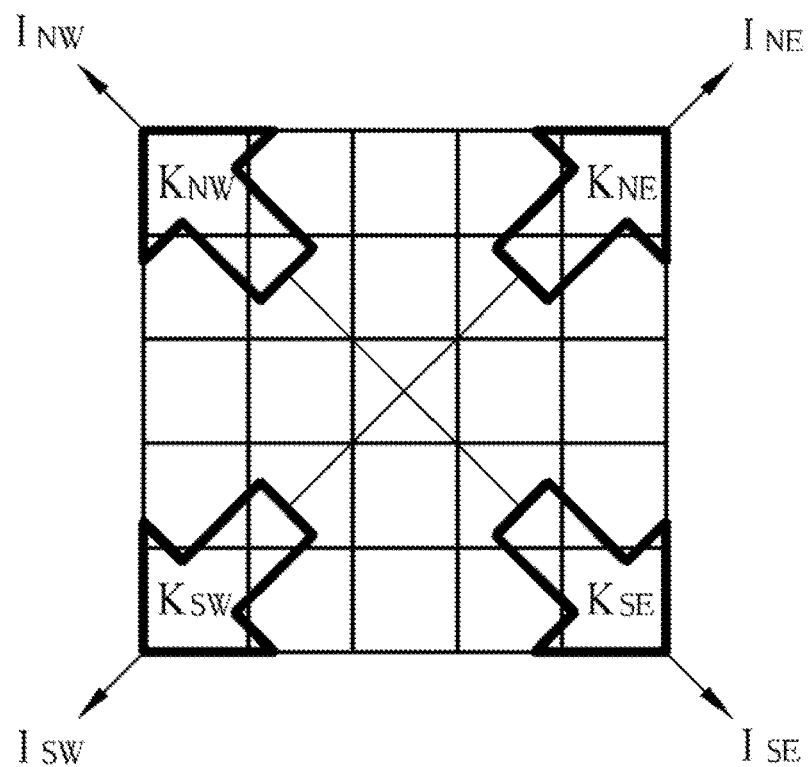
FIG.11
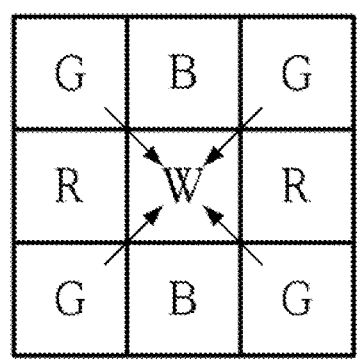
(a)
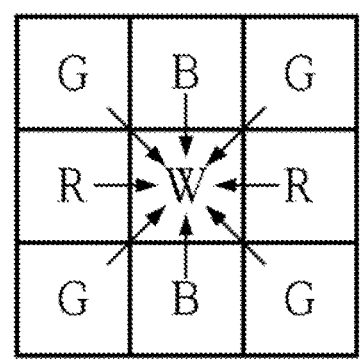
(b)

METHOD FOR CONVERTING A COLOR FILTER ARRAY

CROSS-REFERENCE TO RELATED APPLICATIONS

The present application claims priority of Korean Patent Application No. 10-2015-0138451, filed on Oct. 1, 2015, which is incorporated herein by reference in its entirety.

BACKGROUND

1. Field

Exemplary embodiments of the present invention relate to an image sensor and, more particularly, to a method and a device for converting a color filter array.

2. Description of the Related Art

A mobile communication apparatus, such as a cellular phone is typically equipped with a digital camera employing an image sensor, such as a charge coupled device (CCD), or a complementary metal oxide semiconductor (CMOS) for capturing images.

The image sensor may typically include a pixel array, and a color filter array. For example, a color filter array of a WRGB (White-Red-Green-Blue) Bayer pattern may be arranged above the pixel array. Accordingly, in operation, the pixel array may detect incident through the color filter array and convert it into an electrical signal.

A cited reference (Korean Patent Application Publication No. 10-2011-0023757) describes a technology of converting an RGBW (Red-Green-Blue-White) color filter array into an RGB (Red-Green-Blue) color filter array.

SUMMARY

Various embodiments are directed to a method and a device for converting a White-Red-Green-Blue (WRGB) color filter array into a Red-Green-Blue (RGB) color filter array.

In an embodiment, a method for converting a color filter array includes: (a) correcting a color of a White-Red-Green-Blue (WRGB) color filter array; (b) converting the WRGB color filter array into a Red-Green-Blue (RGB) color filter array; and (c) correcting a green of the RGB color filter array by using a multichannel color difference value.

In an embodiment, a device for converting a color filter array includes: a color correction unit suitable for correcting a color of a White-Red-Green-Blue (WRGB) color filter array; a pattern conversion unit suitable for converting the corrected WRGB color filter array into a (Red-Green-Blue) RGB color filter array; and a green correction unit suitable for correcting a green of the converted RGB color filter array by using a multichannel color difference value.

As described above, according to the present invention, a WRGB color filter array of an image sensor is converted into an RGB arrangement, that is, an RGB Bayer pattern.

Consequently, the present invention is easily applied to a commercial digital camera using the RGB Bayer pattern.

BRIEF DESCRIPTION OF THE DRAWINGS

FIG. 1 is a flowchart of a color filter array conversion method according to an embodiment of the present invention.

FIG. 2 is a flowchart illustrating in detail a pattern conversion step illustrated in FIG. 1.

FIGS. 3 to 5 illustrate the structure of pixels for a correction method of a White-Red-Green-Blue (WRGB) color filter array, according to an embodiment of the present invention.

FIG. 6 to FIG. 10 illustrate the structure of pixels for a method for converting a WRGB color filter array into a Red-Green-Blue (RGB) color filter array, according to an embodiment of the present invention.

FIG. 11 illustrates a structure of pixels for a method for correcting a green, according to an embodiment of the present invention.

DETAILED DESCRIPTION

Figures 3, 4:
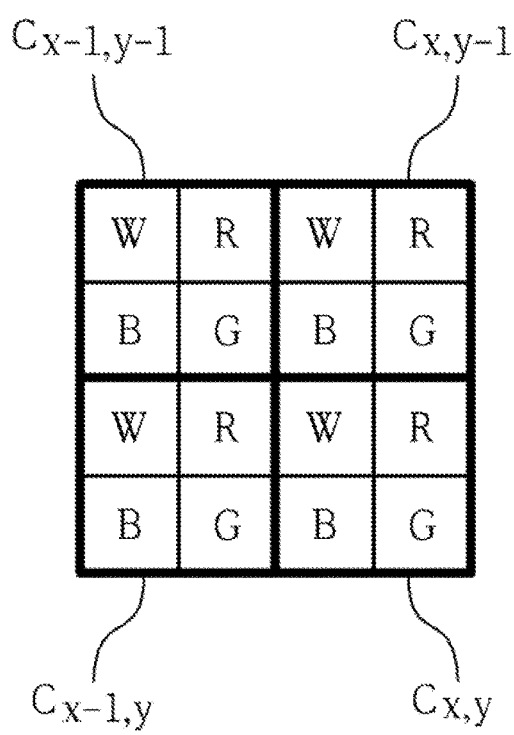

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily drawn to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

For method claims, (a), (b), (c), etc. do not represent sequence or order and may be performed in any order and does not limit the scope of claims in any way. They are merely used for sake of convenience to refer to previously stated process/method.

Referring now to FIG. 1 a flowchart of a color filter array conversion method is provided, according to an embodiment of the present invention.

Accordingly, the color filter array conversion method may include first to third steps 110, 120, and 130. The color filter array conversion method may convert a White-Red-Green-Blue (WRGB) color filter array that is a Bayer pattern or is similar to a Bayer pattern into a Red-Green-Blue (RGB) color filter array of the Bayer pattern. That is, it is a method for converting a W pixel included in the WRGB color filter array into a Green (G) pixel.

The first step 110 is a correction step of correcting colors of pixels of the WRGB color filter array. The colors of the pixels of the WRGB color filter array may be corrected, so that the accuracy of pattern conversion may be improved. The pixels of the WRGB color filter array include a white (W) pixel, a red (R) pixel, a green (G) pixel, and a blue (B) pixel. The W color filter allows light of all colors to pass therethrough, the R color filter allows only red light to pass therethrough, the G color filter allows only green light to pass therethrough, and the B color filter allows only blue light to pass therethrough. Accordingly, a relation of $(R+G+B) \propto W$ is established. The W pixel may have a signal-to-noise ratio (SNR) characteristic superior to those of the R, G, and the B pixels. In other words, a W image has a relatively higher reliability than a R, G, or B image. Accordingly, it may be preferable to correct the colors of the R, G, and B pixels on the basis of the W pixel. In order to correct the colors of the pixels, it may be necessary to detect a correction point which may be subjected to color correction.

A first method for detecting the correction point on the basis of the W pixel may include:

(1) A local ratio of W with respect to R, G and B in a unit matrix including W, R, G, and B may be calculated using Equation 1 below.

$$C_{local} = W/(R+G+B) \quad (1)$$

(2) The local ratio may then be compared with predetermined thresholds, for example, a lower limit value and an upper limit value. As a result of the comparison, when the local ratio is lower than the lower limit value as expressed by Equation 2 below or is greater than the upper limit value as expressed by Equation 3 below, a unit matrix having the local ratio may be determined to include error pixels.

$$\frac{C_{x,y}}{\text{mean}(C_{x-1,y-1}, C_{x,y-1}, C_{x-1,y}, C_{x,y})} < \text{lower limit value} \quad (2)$$

$$\frac{C_{x,y}}{\text{mean}(C_{x-1,y-1}, C_{x,y-1}, C_{x-1,y}, C_{x,y})} > \text{upper limit value} \quad (3)$$

In Equations 2 and 3 above, the local ratios, that is, $C_{x-1,y-1}$, $C_{x,y-1}$, $C_{x-1,y}$, and $C_{x,y}$ may be defined as illustrated in FIG. 4.

A second method for detecting the correction point on the basis of the W pixel may include:

(1) A W' color value may be calculated in the unit matrix including W, R, G, and B by using Equation 1 above and Equation 4 below.

$$W' = (R+G+B) \times C_{local} \quad (4)$$

wherein $C_{local}$, for example, may be set to 0.7602.

(2) W may then be compared with W'.

(3) As a result of the comparison, when the difference between W and W' is greater than a predetermined threshold, it may be determined that significant noise is included in the unit matrix.

It is noted that a color edge and a saturated part may not be used in the second method.

When the correction point is detected using a correction point detection method as described above, the following method may be used in order to detect pixels, which may be subjected to color correction, from the correction point.

When the correction point is detected, the R, G, and B pixels in the unit matrix including the correction point may be inspected.

First, the R pixel may be inspected. That is, as shown in (a) of FIG. 3, the R pixel may be inspected to determine whether there is a difference between a value (R+G+B) obtained by summing up specific R, G, and B in the unit matrix and a value (R+G'+B') obtained by summing up adjacent R, G', and B'. In such a manner, the R pixel may be inspected for other adjacent pixels R, G, and B in the unit matrix.

Then, the B pixel may be inspected. That is, as shown in (b) of FIG. 3, the B pixel may be inspected to determine whether there is a difference between a value (R+G+B) obtained by summing up specific R, G, and B in a unit matrix and a value (R'+G'+B) obtained by summing up adjacent R', G', and B. In such a manner, the B pixel may be inspected for other adjacent pixels R, G, and B in the unit matrix.

Last, the G pixel may be inspected. That is, as shown in (c) of FIG. 3, the G pixel may be inspected to determine whether there is a difference between a value (R+G+B) obtained by summing up R, G, and B and a value (R'+G+B') obtained by summing up adjacent R', G, and B'. In such a manner, the G pixel may be inspected for other adjacent pixels R, G, and B in the unit matrix.

The pixel inspection order may be changed.

The W pixel may not be inspected.

As a result of the inspection, when pixels with a difference greater than a predetermined threshold are found, these pixels are set as color correction target pixels. The color correction target pixels may be corrected, so that the color accuracy of a color pixel array may be improved.

As a result of the inspection, when pixels having a difference greater than the predetermined threshold are not found, the pixels are determined as valid pixels with no noise.

The color correction target pixels may be corrected using Equation 5 below.

$$(R+G+B) \times C = W \quad (5)$$

wherein, R, G, B, W ∈ M

M denotes a unit matrix including a W, R, G, and B pixels.

Referring again to FIG. 1, the second step 120 is a pattern conversion step of converting the WRGB color filter array into an RGB color filter array. The pattern conversion step (second step 120) will be described in detail with reference to FIG. 2.

Referring to FIG. 2, the pattern conversion step 120 may include a color edge information extraction step 121, a green color value estimation step 122, and a green color update step 123 using an adaptive weight.

In the color edge information extraction step 121, a color correlation among the W, R, G, and B pixels may be calculated and an edge direction map of the pixels may be created.

First, a method for calculating the color correlation among the W, R, G, and B pixels will be described.

A value W of the W pixel may be defined as expressed by Equation 6 below.

$$W = \alpha R + \beta G + \gamma B \quad (6)$$

Wherein R denotes a value of the R pixel, G denotes a value of the G pixel, and B denotes a value of the B pixel. Furthermore, α, β, and γ are correlation coefficients representing a correlation among the R, G, and B pixels.

Equation 6 may be derived using a 2×2 matrix structure including one W pixel, one R pixel, one G pixel, and one B pixel, as shown in FIG. 5.

The correlation coefficients a, b, and g may be calculated using a least square of a non-singular situation expressed by Equation 7 below.

$$\operatorname*{argmin}_{\alpha,\beta,\gamma} \left\{ \sum_{W,R,G,B} (W - (\alpha R + \beta G + \gamma B))^2 \right\} \quad (7)$$

Equation 7 above may be more simply expressed by Equation 8 below.

$$Ax = b \quad (8)$$

In Equation 8 above, A, x, and b may be expressed by Equation 9 below.

$$A = \begin{bmatrix} R_1 & G_1 & B_1 \\ R_2 & G_2 & B_2 \\ R_3 & G_3 & B_3 \\ R_4 & G_4 & B_4 \\ \vdots & \vdots & \vdots \end{bmatrix} \quad (9)$$

$$x = \begin{bmatrix} \alpha \\ \beta \\ \gamma \end{bmatrix}$$

$$b = \begin{bmatrix} W_1 \\ W_2 \\ W_3 \\ W_4 \\ \vdots \end{bmatrix}$$

The values of the correlation coefficients $\alpha$, $\beta$, and $\gamma$ may be calculated using Equations 8 and 9 above.

Then, a method for creating the edge direction map will be described. In order to create the edge direction map, an edge strength map may first be created. An example of the edge strength map is Illustrated in (b) of FIG. 6.

In the edge strength map, $S_{i,j}$ denotes the edge strength of a corresponding cell (e.g., FIGS. 8 and 9). The edge strength of each pixel may be calculated using Equation 10 below.

$$S_{i,j} = \frac{|G_{i-1,j-1} - G_{i+1,j+1}|}{2} + \frac{|G_{i-1,j+1} - G_{i+1,j-1}|}{2} + |R_{i-1,j} - R_{i+1,j}| + |B_{i,j-1} - B_{i,j+1}| \quad (10)$$

For example, for calculating one edge strength $S_{2,2}$ (corresponding to the edge strength of a W pixel) of the edge strengths of pixels included in the edge strength map Equation 10 above is expressed by Equation 11 below.

$$S_{2,2} = \frac{|G_{1,1} - G_{3,3}|}{2} + \frac{|G_{1,3} - G_{3,1}|}{2} + |R_{1,2} - R_{3,2}| + |B_{2,1} - B_{2,3}| \quad (11)$$

By using the edge strengths calculated using Equation 11 above, the edge direction of each pixel may be checked. Each pixel has four edge directions 45° ($I_{NE}$), 135° ($I_{NW}$), 225° ($I_{SW}$), and 315° ($I_{SE}$) as illustrated in FIG. 10. An edge value $D\_45_{i,j}$ in the 45° direction and an edge value $D\_135_{i,j}$ in the 135° direction may be checked using Equation 12 below.

$$D\_45_{i,j} = \sum_{m=-2}^{1} \left( \sum_{n=-1}^{2} (S_{i+m-1,j+n} - S_{i+m,j+n-1}) \right) \quad (12)$$

$$D\_135_{i,j} = \sum_{m=-2}^{1} \left( \sum_{n=-2}^{1} (S_{i+m,j+n} - S_{i+m-1,j+n+1}) \right)$$

As a result of the calculation of Equation 12 above, when the edge value $D\_45_{i,j}$ in the 45° direction is greater than the edge value $D\_135_{i,j}$ in the 135° direction, a corresponding pixel has the edge value $D\_45_{i,j}$ in the 45° direction, but when the edge value $D\_135_{i,j}$ in the 135° direction is greater than the edge value $D\_45_{i,j}$ in the 45° direction, the corresponding pixel has the edge value $D\_135_{i,j}$ in the 135° direction. An example of an edge direction map, in which edge values have been set, is illustrated in FIG. 7. In FIG. 7, D1 denotes the edge value in the 45° direction and D2 denotes the edge value in the 135° direction.

By using the aforementioned edge direction map, it may be possible to check the edge direction of the W pixel. By confirming the edge direction of the W pixel, it may be possible to determine which a pixel may be referred to when a green value of the W pixel is estimated. That is, the green value of the W pixel may be estimated by referring to G pixels existing in an edge direction. By using the aforementioned method, blur may be significantly reduced in or near the edge of an image as compared with an existing method.

If the green value of the W pixel is estimated without using the edge direction map, blur may frequently occur in or near the edge of an image. For example, in the case in which the edge direction of the W pixel is 135°, when pixels in 45° direction are referred, the green value of the W pixel is an average value of colors (for example, a red color and a yellow color) of pixels existing in the 45° direction, for example, is an orange color (an average value of a red color and a yellow color). Therefore, blur may significantly increase in the edge of an image.

In the second step 120, only 45° and 135° are used as edge directions. That is, as Illustrated in (a) of FIG. 11, a 2-channel color difference value using pixels in a 45° diagonal direction and a 135° diagonal direction is used.

As described above, in the second step 120, the two operations (the operation for calculating the color correlation among the W, R, G, and B pixels and the operation for creating the edge direction map of the pixels) are performed, wherein such two operations may also be simultaneously performed or sequentially performed and the results are the same.

In the green value estimation step 122, a green value of the W pixel may be estimated using the color correlation coefficients and the edge direction map. A method for estimating the green value of the W pixel may be as follows.

The green value G of the W pixel may be calculated using Equation 13 below. Equation 13 corresponds to the case in which the W pixel has the edge value in the 135° direction.

$$G = A + E = W \times \frac{G_{average,135°}}{\alpha R_{average} + \beta G_{average,135°} + \gamma B_{average}} + E \quad (13)$$

In Equation 13 above, A denotes an average value of two adjacent G pixels in the 135° direction, E denotes a non-linear error, W denotes the value of the W pixel, $\alpha$, $\beta$, and $\gamma$ respectively denote color correlation coefficients of the R, G, and B pixels, $R_{average}$ denotes an average value of R pixels around the W pixel, $G_{average}$ denotes an average value of G pixels around the W pixel, $B_{average}$ denotes an average value of B pixels around the W pixel, and $G_{average,135°}$ denotes an average value of G pixels in the 135° direction around the W pixel.

The non-linear error E may be calculated by Equation 14 below.

$$E = \frac{(W(3) - W(1)) + (W(3) - W(5))}{k} = \frac{2W(3) - W(1) - W(5)}{k} \quad (14)$$

wherein k denotes an edge strength coefficient.

When the W pixel has the edge value in the 45° direction, there is a change in internal variables of Equation 14 for calculating the green value G of the W pixel.

Equation 15 below may be derived from Equation 13 and Equation 14 above. That is, the green values ($G\_45_{i,j}$, $G\_135_{i,j}$) of the W pixel may be calculated using Equation 15 below.

$$G\_45_{i,j} = W_{i,j} \times \frac{G_{average\ 45°}}{\alpha R_{average} + \beta G_{average\ 45°} + \gamma B_{average}} + \frac{2 \times W_{i,j} - W_{i-2,j-2} - W_{i+2,j+2}}{k}$$

$$G\_135_{i,j} = W_{i,j} \times \frac{G_{average\ 135°}}{\alpha R_{average} + \beta G_{average\ 135°} + \gamma B_{average}} + \frac{2 \times W_{i,j} - W_{i+2,j-2} - W_{i-2,j+2}}{k}$$

(15)

Wherein, $G\_45_{i,j}$ denotes a green value when the W pixel has the edge value in the 45° direction, and $G\_135_{i,j}$ denotes a green value when the W pixel has the edge value in the 135° direction. Accordingly, one of the two green values ($G\_45_{i,j}$, $G\_135_{i,j}$) may be selected for use according to the edge direction map.

Estimating the green value of the W pixel as described above, may allow converting the W pixel into the G pixel having a green value.

As described above, the green value of the W pixel may be estimated, so that the WRGB color filter array may be converted into the RGB color filter array, that is, the RGB Bayer pattern. Accordingly, in a commercial camera using the RGB Bayer pattern, it is easy to use an image sensor using the WRGB color filter array. Furthermore, in the present invention, since a green value may be estimated using an edge direction, the accuracy around an edge may be improved, resulting in significantly reduced blur in or near the edges of an image.

In the green update step 123, the green of the RGB color filter array may be updated using an adaptive weight. A green value $g_{i,j}$ using the adaptive weight may be calculated using Equation 16 below.

$$\therefore \breve{g}_{i,j} =$$ (16)

$$\begin{cases} W_{i,j} + \frac{G_{i-1,j+1} - \hat{w}_{i-1,j+1}}{4} + \frac{\hat{g}_{i,j}^{D1} - W_{i,j}}{2} + \frac{G_{i+1,j-1} - \hat{w}_{i+1,j-1}}{4}, \\ \quad \text{if } E_{D(i,j)} = D1 \\ W_{i,j} + \frac{G_{i-1,j-1} - \hat{w}_{i-1,j-1}}{2} + \frac{\hat{g}_{i,j}^{D2} - W_{i,j}}{2} + \frac{G_{i+1,j+1} - \hat{w}_{i+1,j+1}}{4}, \\ \quad \text{if } E_{D(i,j)} = D2 \end{cases}$$

$$\therefore \breve{g}_{i,j} = W_{i,j} + \Delta \tilde{C}_{gw(i,j)}$$

$$= W_{i,j} + \frac{1}{2}(\breve{g}_{i,j} - W_{i,j}) +$$

$$\frac{1}{2}\left\{\frac{I_{NE}(G_{i+1,j-1} - \breve{w}_{i-1,j-1}) + I_{NW}(G_{i-1,j-1} - \breve{w}_{i-1,j-1}) +}{I_{NE} + I_{NW} + I_{SW} + I_{SE}}\right\}$$

$$\breve{w}_{i,j} = \frac{I_{NE}W_{i-1,j-1} + I_{NW}W_{i-1,j-1} + I_{SW}W_{i-1,j-1} + I_{SE}W_{i+1,j-1}}{I_{NE} + I_{NW} + I_{SW} + I_{SE}} +$$

-continued $$\frac{I_{NE}(G_{i,j} - G_{i-2,j-2}) + I_{NW}(G_{i,j} - G_{i-2,j-2}) +}{2(I_{NE} + I_{NW} + I_{SW} + I_{SE})}$$

$$\frac{I_{SW}(G_{i,j} - G_{i-2,j+2}) + I_{SE}(G_{i,j} - G_{i-2,j-2})}{2(I_{NE} + I_{NW} + I_{SW} + I_{SE})}$$

$$\breve{g}_{i,j} = \frac{I_{NE}G_{i+1,j-1} + I_{NW}G_{i-1,j-1} + I_{SW}G_{i-1,j+1} + I_{SE}G_{i+1,j+1}}{I_{NE} + I_{NW} + I_{SW} + I_{SE}} +$$

$$\frac{I_{NE}(W_{i,j} - W_{i+2,j-2}) + I_{NW}(W_{i,j} - W_{i-2,j-2}) +}{2(I_{NE} + I_{NW} + I_{SW} + I_{SE})}$$

$$\frac{I_{SW}(W_{i,j} - W_{i-2,j+2}) + I_{SE}(W_{i,j} - W_{i+2,j+2})}{2(I_{NE} + I_{NW} + I_{SW} + I_{SE})}$$

The adaptive weight Is set by Equation 17 below with reference to FIG. 10.

$$\begin{cases} I_{NE} = K_{NW} \times K_{SW} \times K_{SE} \\ I_{NW} = K_{NE} \times K_{SW} \times K_{SE} \\ I_{SW} = K_{NE} \times K_{NW} \times K_{SE} \\ I_{SE} = K_{NE} \times K_{NW} \times K_{SW} \end{cases} \begin{cases} I_N = K_S \times K_E \times K_W \\ I_S = K_N \times K_E \times K_W \\ I_E = K_N \times K_S \times K_W \\ I_W = K_N \times K_S \times K_E \end{cases}$$ (17)

$$\begin{cases} K_{NE} = |S_{i,j} - S_{i+1,j-1}| + |S_{i+1,j-1} - S_{i+2,j-2}| \\ K_{NW} = |S_{i,j} - S_{i-1,j-1}| + |S_{i-1,j-1} - S_{i-2,j-2}| \\ K_{SW} = |S_{i,j} - S_{i-1,j+1}| + |S_{i-1,j+1} - S_{i-2,j+2}| \\ K_{SE} = |S_{i,j} - S_{i+1,j+1}| + |S_{i+1,j+1} - S_{i+2,j+2}| \end{cases}$$

$$\begin{cases} K_N = |S_{i,j} - S_{i,j-1}| + |S_{i,j-1} - S_{i,j-2}| \\ K_S = |S_{i,j} - S_{i,j+1}| + |S_{i,j+1} - S_{i,j+2}| \\ K_E = |S_{i,j} - S_{i+1,j}| + |S_{i+1,j} - S_{i+2,j}| \\ K_W = |S_{i,j} - S_{i-1,j}| + |S_{i-1,j} - S_{i-2,j}| \end{cases}$$

In Equation 17 above, the Inversely correlated weight $I_{NE}$ can be achieved by multiplying three temporal weights, $K_{NW}$, $K_{SW}$, and $K_{SE}$, which have different directional subscripts than $I_{NE}$.

In the third step 130, the green estimated using the multichannel color difference value in the second step 120 may be corrected through the following processes. In order to use the multichannel color difference value, all peripheral pixels around the W pixel may be used as illustrated in (b) of FIG. 11.

(1) A calculation Equation of a color difference value ($\Delta C_{i,j}$) is defined as expressed by Equation 18 below.

$$\Delta C_{i,j} = G_{i,j} - W_{i,j} - R_{i,j} - B_{i,j}$$ (18)

(2) The calculation Equation of the color difference value may be enlarged from a 1×1 matrix to a 3×3 matrix as expressed by Equation 19 below.

$$\Delta C'_{i,j} = \frac{\Delta C_{i-1,j-1}}{16} + \frac{\Delta C_{i-1,j}}{16} + \frac{\Delta C_{i-1,j+1}}{16} + \frac{\Delta C_{i,j-1}}{16} + \frac{\Delta C_{i,j}}{2} +$$ (19)

$$\frac{\Delta C_{i,j+1}}{16} + \frac{\Delta C_{i+1,j-1}}{16} + \frac{\Delta C_{i+1,j}}{16} + \frac{\Delta C_{i+1,j+1}}{16}$$

$$= \frac{G_{i-1,j-1} - w_{i-1,j-1} - r_{i-1,j-1} - b_{i-1,j-1}}{16} +$$

$$\frac{g_{i-1,j} - w_{i-1,j} - R_{i-1,j} - b_{i-1,j}}{16} +$$

$$\frac{G_{i-1,j+1} - w_{i-1,j+1} - r_{i-1,j+1} - b_{i-1,j+1}}{16} +$$

$$\frac{g_{i,j-1} - w_{i,j-1} - r_{i,j-1} - B_{i,j-1}}{16} + \frac{g_{i,j} - W_{i,j} - r_{i,j} - b_{i,j}}{2} +$$

-continued $$\frac{g_{i,j+1} - w_{i,j+1} - r_{i,j+1} - B_{i,j+1}}{16} +$$

$$\frac{G_{i+1,j-1} - w_{i+1,j-1} - r_{i+1,j-1} - b_{i+1,j-1}}{16} +$$

$$\frac{g_{i+1,j} - w_{i+1,j} - R_{i+1,j} - b_{i+1,j}}{16} +$$

$$\frac{G_{i+1,j+1} - w_{i+1,j+1} - r_{i+1,j+1} - b}{16}$$

(3) The enlarged calculation Equation may be applied to original pixels, so that the green may be corrected as expressed by Equation 20 below.

$$G_{i,j} = W_{i,j} + R_{i,j} + B_{i,j} + \Delta C'_{i,j} \quad (20)$$

$$\tilde{g}_{i,j} = W_{i,j} + R_{i,j} + B_{i,j} + \frac{G_{i-1,j-1} - w_{i-1,j-1} - r_{i-1,j-1} - b_{i-1,j-1}}{16} +$$

$$\frac{g_{i-1,j} - w_{i-1,j} - R_{i-1,j} - b_{i-1,j}}{16} +$$

$$\frac{G_{i-1,j+1} - w_{i-1,j+1} - r_{i-1,j+1} - b_{i-1,j+1}}{16} +$$

$$\frac{g_{i,j-1} - w_{i,j-1} - r_{i,j-1} - B_{i,j-1}}{16} +$$

$$\frac{g_{i,j} - W_{i,j} - r_{i,j} - B_{i,j}}{2} + \frac{g_{i,j+1} - w_{i,j+1} - r_{i,j+1} - B_{i,j+1}}{16} +$$

$$\frac{G_{i+1,j-1} - w_{i+1,j-1} - r_{i+1,j-1} - b_{i+1,j-1}}{16} +$$

$$\frac{g_{i+1,j} - w_{i+1,j} - R_{i+1,j} - b_{i+1,j}}{16} +$$

$$\frac{G_{i+1,j+1} - w_{i+1,j+1} - r_{i+1,j+1} - b_{i+1,j+1}}{16}$$

In Equation 20 above, $w_{i,j}$, $r_{i,j}$, $g_{i,j}$, and $b_{i,j}$ denote temporary estimators.

A method for correcting the green by using the multichannel color difference value employing the adaptive weight may be acquired by Equation 21 below.

$$\Delta \tilde{C}_{i,j} = \frac{1}{2} \Delta C_{i,j} + \frac{1}{2} \left( \frac{\begin{array}{c} I_{NE} \Delta C_{i+1,j-1} + I_{NW} \Delta C_{i-1,j-1} + I_{SW} \Delta C_{i-1,j+1} + \\ I_{SE} \Delta C_{i+1,j+1} + I_N \Delta C_{i,j-1} + I_S \Delta C_{i,j+1} + \\ I_E \Delta C_{i+1,j} + I_W \Delta C_{i-1,j} \end{array}}{I_{NE} + I_{NW} + I_{SW} + I_{SE} + I_N + I_S + I_E + I_W} \right) \quad (21)$$

$$= \frac{1}{2}(g_{i,j} - W_{i,j} - r_{i,j} - b_{i,j}) +$$

$$\left( \begin{array}{c} I_{NE}(G_{i+1,j-1} - w_{i+1,j-1} - r_{i+1,j-1} - b_{i+1,j-1}) + \\ I_{NW}(G_{i-1,j-1} - w_{i-1,j-1} - r_{i-1,j-1} - b_{i-1,j-1}) + \\ I_{SW}(G_{i-1,j+1} - w_{i-1,j+1} - r_{i-1,j+1} - b_{i-1,j+1}) + \\ I_{SE}(G_{i+1,j+1} - w_{i+1,j+1} - r_{i+1,j+1} - b) + \\ I_N(g_{i,j-1} - w_{i,j-1} - r_{i,j-1} - B_{i,j-1}) + \\ I_S(g_{i,j+1} - w_{i,j+1} - r_{i,j+1} - B_{i,j+1}) + \\ I_E(g_{i+1,j} - w_{i+1,j} - R_{i+1,j} - b_{i+1,j}) + \\ I_W(g_{i-1,j} - w_{i-1,j} - R_{i-1,j} - b_{i-1,j}) \end{array} \right)$$

$$\overline{2(I_{NE} + I_{NW} + I_{SW} + I_{SE} + I_N + I_S + I_E + I_W)}$$

$$\therefore \tilde{g}_{i,j} = W_{i,j} + R_{i,j} + B_{i,j} + \Delta \tilde{C}_{i,j} =$$

$$W_{i,j} + R_{i,j} + B_{i,j} + \frac{1}{2}(g_{i,j} - W_{i,j} - r_{i,j} - b_{i,j}) +$$

$$\left( \begin{array}{c} I_{NE}(G_{i+1,j-1} - w_{i+1,j-1} - r_{i+1,j-1} - b_{i+1,j-1}) + \\ I_{NW}(G_{i-1,j-1} - w_{i-1,j-1} - r_{i-1,j-1} - b_{i-1,j-1}) + \\ I_{SW}(G_{i-1,j+1} - w_{i-1,j+1} - r_{i-1,j+1} - b_{i-1,j+1}) + \\ I_{SE}(G_{i+1,j+1} - w_{i+1,j+1} - r_{i+1,j+1} - b) + \\ I_N(g_{i,j-1} - w_{i,j-1} - r_{i,j-1} - B_{i,j-1}) + \\ I_S(g_{i,j+1} - w_{i,j+1} - r_{i,j+1} - B_{i,j+1}) + \\ I_E(g_{i+1,j} - w_{i+1,j} - R_{i+1,j} - b_{i+1,j}) + \\ I_W(g_{i-1,j} - w_{i-1,j} - R_{i-1,j} - b_{i-1,j}) \end{array} \right)$$

$$\overline{2(I_{NE} + I_{NW} + I_{SW} + I_{SE} + I_N + I_S + I_E + I_W)}$$

Figure 12:
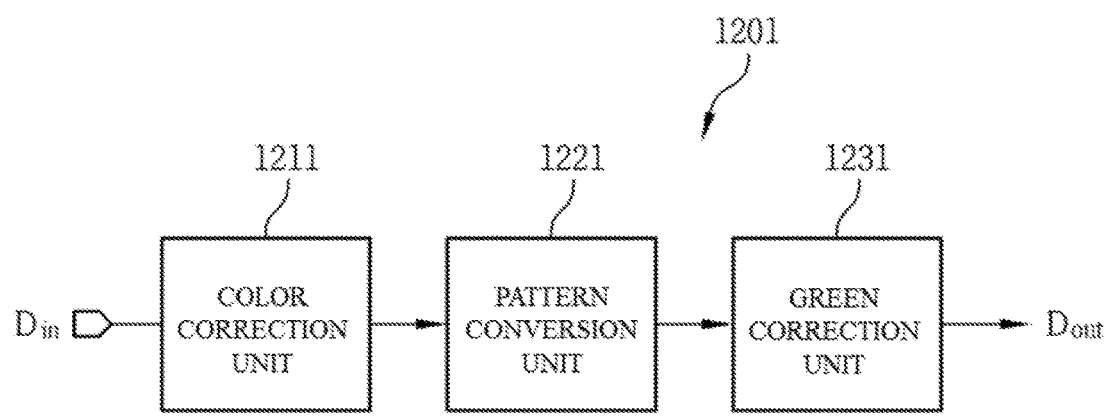
FIG. 12 is a block diagram of a color filter array conversion device, according to an embodiment of the present invention.

FIG. 12 is a block diagram of a color filter array conversion device according to an embodiment of the present invention.

Referring to FIG. 12, a color filter array conversion device 1201, according to an embodiment of the invention, may include a color correction unit 1211, a pattern conversion unit 1221, and a green correction unit 1231.

The color correction unit 1211 may correct the colors of the WRGB color filter array for inputted image data Din. In more detail, the color correction unit 1211 may detect color correction target pixels and correct the detected color correction target pixels.

The pattern conversion unit 1221 may be connected to the color correction unit 1211 and convert the corrected WRGB color filter array into an RGB color filter array. For example, the pattern conversion unit 1221 may extract edge information of the WRGB color filter array and a green value from the edge information by using a 2-channel color difference value.

The green correction unit 1231 may be connected to the pattern conversion unit 1221 and correct the green of the converted RGB color filter array by using a multichannel color difference value. For example, the green correction unit 1231 may set a difference value between a color value of the W pixel and color values of the R, G, and B pixels around the W pixel as the multichannel color difference value. Data Dout, in which the arrangement of the color filter array has been converted from the WRGB to the RGB, may be transferred from the green correction unit 1231.

Since a method, by which the color filter array conversion device converts the color filter array, has been described in detail through FIGS. 1 to 11, a detailed description thereof will be omitted in order to avoid redundancy.

Figure 13:
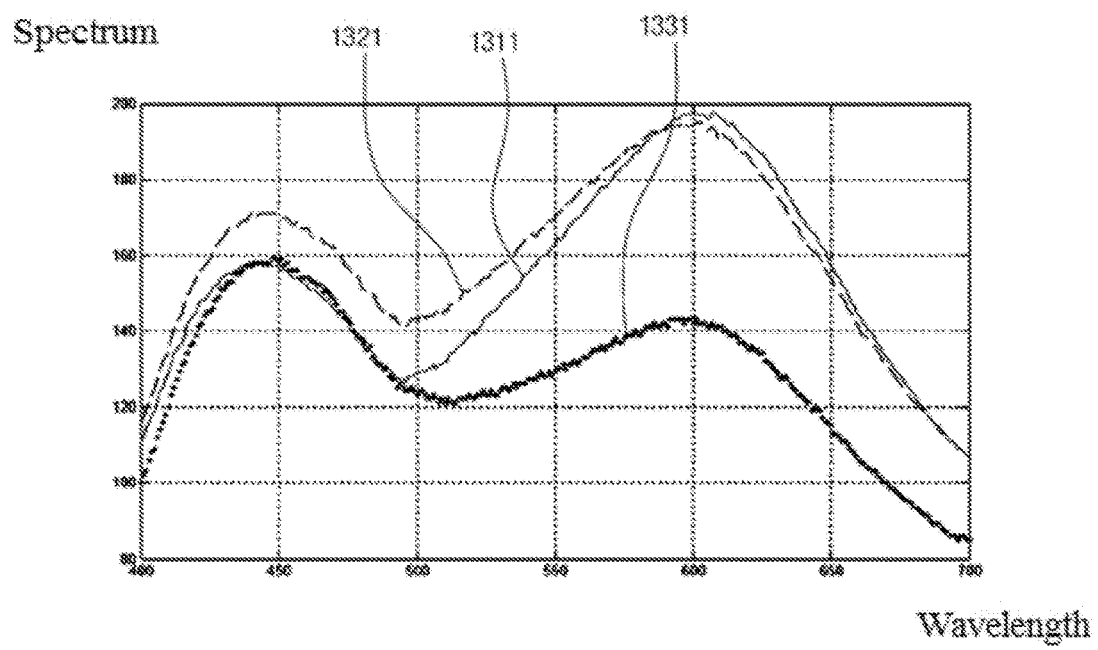
FIG. 13 illustrates spectrums reproduced using an embodiment of the present invention and a related art.

FIG. 13 illustrates spectrums reproduced using the present Invention and a related art. In FIG. 13, a horizontal axis denotes a wavelength and a vertical axis denotes values of the spectrums. Referring to FIG. 13, the spectrum 1321 reproduced by the present invention is more similar to an ideal spectrum 1311 as compared with the spectrum 1331 reproduced by the prior art.

As described above, when an image is reproduced using the WRGB-RGB conversion method according to the present invention, the accuracy of an image is significantly improved as compared with the prior art.

Although various embodiments have been described for illustrative purposes, it will be apparent to those skilled in the art that various changes and modifications may be made without departing from the spirit and or scope of the invention as defined in the following claims.

What is claimed is:

1. An image conversion method comprising:
   correcting a color of a White-Red-Green-Blue (WRGB) color filter array of an image sensor;
   converting the WRGB color filter array of the image sensor into a Red-Green-Blue (RGB) color filter array; and
   correcting a green of the RGB color filter array by using a multichannel color difference value,
   wherein correcting a color of a White-Red-Green-Blue (WRGB) color filter array of the image sensor comprises:
   calculating a local ratio between a W pixel and an R pixel, a G pixel, and a B pixel in a unit matrix including the W pixel, the R, G, and B pixels;
   multiplying the local ratio by a value obtained by summing up the R, the G, and the B and calculating a modified W; and
   comparing the modified W with an original W and determining that noise exists in the unit matrix when a result of the comparison result is greater than a predetermined threshold; and
   inspecting whether there is a difference between sum of the R, G, and B pixels in the unit matrix and sum of adjacent R, G, and B pixels for each of the R, G, and B pixels and detecting a corresponding pixel as a color correction target pixel when the difference is greater than a predetermined threshold
   correcting the color of the color correction target pixel.

2. The image conversion method of claim 1, wherein inspecting whether there is a difference between sum of the R, G, and B pixels in the unit matrix and sum of adjacent R, G, and B pixels for each of the R, G, and B pixels comprises:
   inspecting whether there is the difference between the sum of the R, G, and B pixels in the unit matrix and the sum of adjacent R, G, and B pixels based on the R pixel;
   inspecting whether there is the difference between the sum of the R, G, and B pixels in the unit matrix and the sum of adjacent R, G, and B pixels based on the G pixel;
   inspecting whether there is the difference between the sum of the R, G, and B pixels in the unit matrix and the sum of adjacent R, G, and B pixels based on the B pixel; and
   detecting the corresponding pixel as the color correction target pixel when the difference is greater than the predetermined threshold.

3. The image conversion method of claim 1, wherein correcting the color of the color correction target pixel comprises:
   correcting the color of the color correction target pixel using equation that product of the sum of the R, G, and B pixels and the local ratio is a value of W pixel.

4. The image conversion method of claim 1, wherein converting the WRGB color filter array of the image sensor into a Red-Green-Blue (RGB) color filter array comprises:
   extracting edge information of the WRGB color filter array of the image sensor; and
   estimating a green value from the edge information by using a 2-channel color difference value.

5. The image conversion method of claim 4, wherein converting the WRGB color filter array of the image sensor into a Red-Green-Blue (RGB) color filter array further comprises:
   correcting the green value by using an adaptive weight.

6. The image conversion method of claim 1, wherein, in converting the WRGB color filter array of the image sensor into a Red-Green-Blue (RGB) color filter array, color correlation coefficients having a color correlation among a W pixel, an R pixel, a G pixel, and a B pixel in a unit matrix are calculated to create an edge direction map of the pixels, and a green value of the W pixel is estimated using the color correlation coefficients and the edge direction map.

7. The image conversion method of claim 1, wherein the multichannel color difference value is a difference value between a color value of a W pixel and color values of an R pixel, a G pixel, and a B pixel around the W pixel.

8. The image conversion method of claim 1, wherein the image sensor is one of a charge coupled device (CCD) or a complementary metal oxide semiconductor.

* * * * *